United States Patent [19]

Coste

[11] Patent Number: 4,984,638
[45] Date of Patent: Jan. 15, 1991

[54] PLOW WITH SYMMETRICAL BODIES HAVING CONCAVE VERTICAL AND HORIZONTAL CROSS-SECTIONS

[76] Inventor: Denis Coste, 24 rue Georges Denance, 93270 Sevran, France

[21] Appl. No.: 333,629
[22] PCT Filed: Aug. 6, 1987
[86] PCT No.: PCT/FR87/00308
§ 371 Date: Feb. 10, 1989
§ 102(e) Date: Feb. 10, 1989
[87] PCT Pub. No.: WO88/01129
PCT Pub. Date: Feb. 25, 1988

[30] Foreign Application Priority Data

| Aug. 12, 1986 | [FR] | France | 86 11621 |
| Aug. 27, 1986 | [FR] | France | 86 12143 |
| Nov. 19, 1986 | [FR] | France | 86 16114 |
| Jan. 14, 1987 | [FR] | France | 87 00347 |
| Apr. 15, 1987 | [FR] | France | 87 05312 |

[51] Int. Cl.$^5$ .......................... A01B 3/40; A01B 15/08
[52] U.S. Cl. ........................... 172/221; 172/223; 172/760; 172/264
[58] Field of Search ............... 172/206, 204, 213, 215, 172/217, 218, 219, 221, 222, 223, 161, 162, 169, 759, 760, 754

[56] References Cited

U.S. PATENT DOCUMENTS

| 375,802 | 1/1888 | Clark | 172/218 |
| 623,673 | 4/1899 | Kavanagh | 172/222 X |
| 3,101,789 | 8/1963 | Jennings | 172/219 |
| 3,115,191 | 12/1963 | Ward | 172/204 X |
| 3,123,150 | 3/1964 | Jennings | 172/219 |
| 3,305,025 | 2/1967 | Johnson et al. | 172/222 X |
| 4,211,286 | 7/1980 | Allen | 172/222 |
| 4,800,963 | 1/1989 | Gomez | 172/219 |

FOREIGN PATENT DOCUMENTS

| 194482 | 1/1908 | Fed. Rep. of Germany | 172/219 |
| 1169349 | 12/1958 | France |  |
| 1298109 | 5/1962 | France |  |
| 1412348 | 2/1965 | France |  |
| 2244392 | 4/1975 | France |  |
| 2390079 | 12/1978 | France |  |
| 643998 | 8/1962 | Italy | 172/219 |
| 640688 | 1/1979 | U.S.S.R. | 172/219 |
| 178786 | 4/1922 | United Kingdom | 172/217 |

Primary Examiner—Randolph A. Reese
Assistant Examiner—Jeffrey L. Thompson
Attorney, Agent, or Firm—Krass & Young

[57] ABSTRACT

A plow having symmetrical mold-boards and bodies, the plow comprising a hitch 1 connected in particular by means of a pivot 3 and to a main frame 4 which is provided with a pivot 18 receiving a hydraulic actuator 17 whose action causes a beam 8 to pivot about its axis 7 together with body carrier elements 10 provided with mold-boards 11, characterized by a symmetrical mold-board 11 having a concave working surface which is horizontally hollow 46 and vertically hollow 47, with each of its side ends taken in a front position tapering upwardly rearwardly, by a single deflector 45 for both working directions in the form of a sector of a melon, by a strut 10 comprising a safety system including two elements 36 and 78 capable of moving longitudinally relative to each other, and by a pivoting rear rudder blade.

2 Claims, 3 Drawing Sheets

PLOW WITH SYMMETRICAL BODIES HAVING CONCAVE VERTICAL AND HORIZONTAL CROSS-SECTIONS

The present invention relates to a plow with one or more bodies each having a share and a mold-board of a special symmetrical shape, with variable working width and angle and intended to be connected to a tractor provided with a hitch for a trailed tool or with a two or three point linkage for a mounted or a semi-mounted tool.

In the past, changing the working direction as required by so-called "flat" plowing has been done by rotating the body-carrying frame which is fitted with "righthand" bodies and with "lefthand" bodies, thereby increasing the number of parts, and increasing the weight of the plow to the detriment of plow price and tractor performance. Each body is provided with a side piece called a "landside" bearing against the wall of the furrow and intended to prevent the plow from skidding sideways by virtue of the force exerted on the mold-board by the earth, with the mold-board being at an angle of attack α to the line of advance. The presence of the landsides further increases length, since the strip of earth to be turned over can do so freely only after each landside fixed on the preceding body has gone past.

The principle of symmetrical bodies is known, but their mold-boards constituted by elements which are cylindrical or semi-helical in shape and of excess length at the top both behind and in front, suffer from a lack of vertical trailing angle going backwards and downwards, thereby giving rise to front end clogging leading to insufficient penetration and to irregular burying of organic matter. Further, the junction between the outside side face of the plow share and the front, spur-shaped base of the mold-board constitutes an angle in whose hollow ground roots are retained, causing clogging to take place more quickly on entry into the ground when the same side face of the mold-board is used the next time.

Finally, plow body safety systems are known enabling the edge of the plow share to rise in a vertical plane which moves horizontally more or less parallel to the ground, with it being possible to retract the share whose tip pivots about an axis, however these two operations do not take place simultaneously and each of them presents its own drawback, with the first drawback being that the body takes up the selected depth over too long a distance, and the second being a mold-board which is vertically directed and which does not turn over the earth, with this second drawback occurring on all other systems having a share which pivots about a single direction about a pivot or an infinity of directions about a point.

The present invention seeks to provide possible ways of satisfying the above-mentioned drawbacks and insufficiencies and to provide solutions which are more effective and/or less expensive by proposing:

1. A special shape of symmetrical mold-board and share that plow properly in both working directions.

2. A rudder principle guiding the plow and replacing all of the landsides.

3. A single safety system for both working directions.

The various portions of the invention will be better understood from reading the following description and from examining the accompanying drawings which show several embodiments of the various elements used in the invention by way of non-limiting example.

Figure 1:
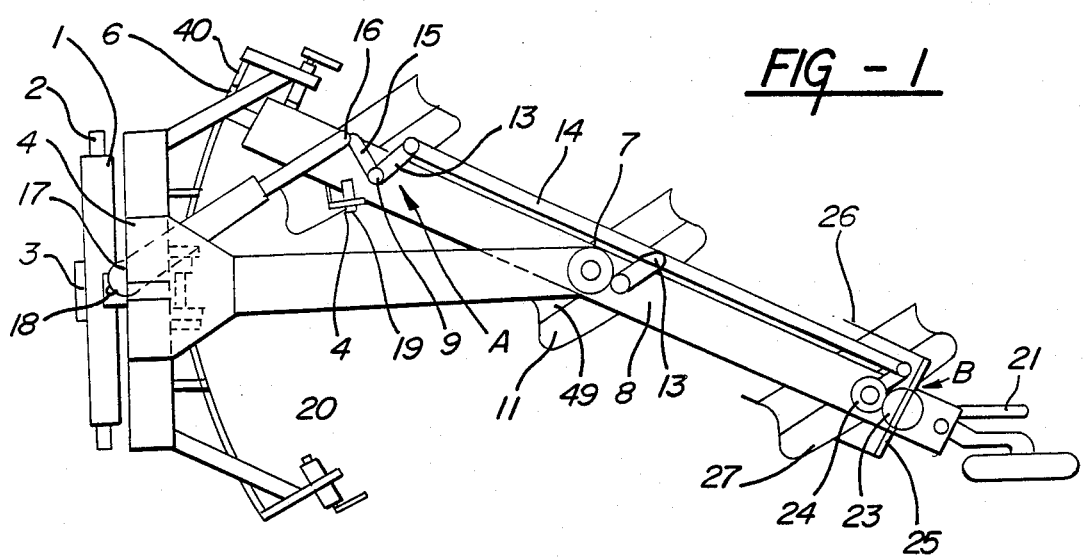
FIG. 1 is a plan view of a plow in accordance with the invention at work turning earth over to the right.
Figure 2:
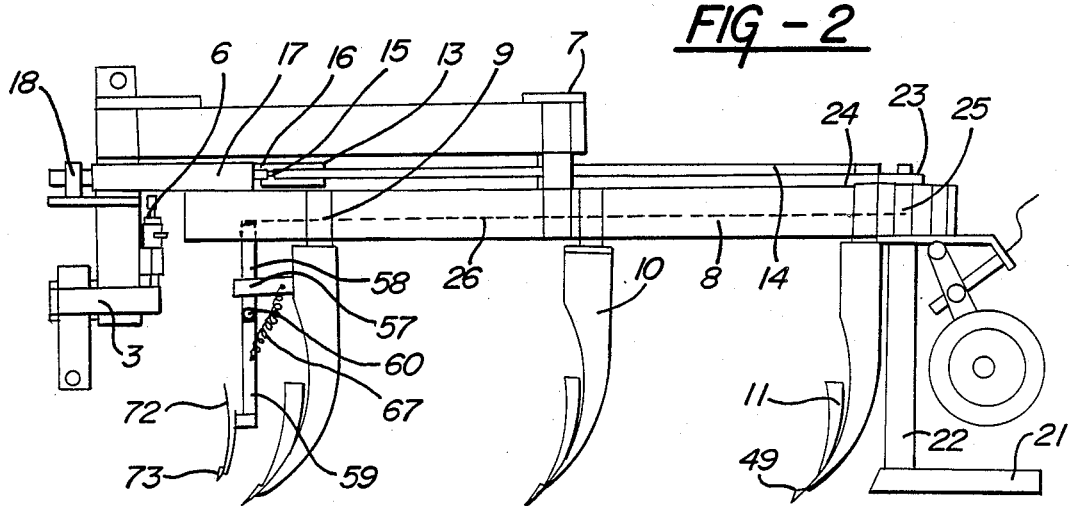
FIG. 2 shows the same assembly in longitudinal section with the body-carrying beam in its middle position.
Figure 5:
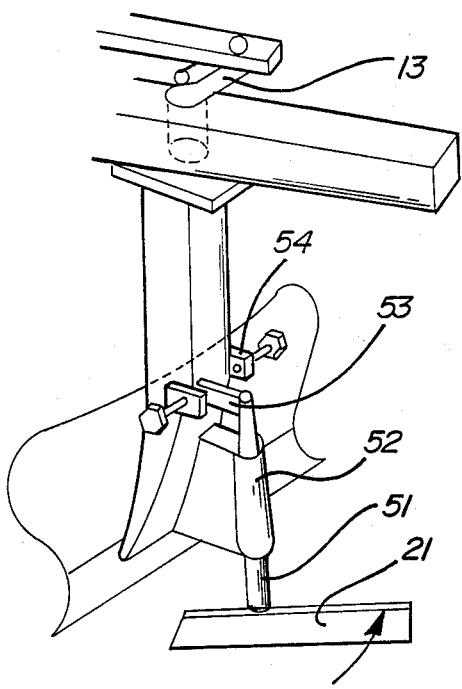
FIG. 5 and 5a show a rear rudder positioned on the rear body or controlled by the system for pivoting the bodies on the beam.

The assembly constituted by FIGS. 1, 2, and 5 bis comprises a hitch frame 1 having pins 2 which are hitched to the draw bars of the tractor, and a pivot shaft 3 which connects it to the main frame 4 which pivots thereon. The horizontal rear portion of the main frame 4 is provided with a vertical pivot 7 about which the beam 8 swivels from right to left and vice versa, said beam 8 being fitted with a plurality of pivots 9 to which the elements for working the ground, i.e. the mold-boards 11 and the shares 12 are fixed via soles 36 and supports 10. Instead of a rigid strut 10, each pivot 9 may receive an optional safety system as described below between itself and its sole 36. Each pivot 9 has a crank 13 fixed thereon, with the cranks all being coupled to a link 14. One of the pivots 9 has an additional crank 15 provided with a terminal pin 16 which receives the piston rod of a hydraulic actuator 17 whose other end swivels about an axis 18 which is fixed to the main frame 4. Two sets of adjustable abutments 19 and 20 are fixed respectively on the beam 8 and on the frame 4 and serve respectively to limit the amplitude of the bodies relative to the beam delimiting the body attack angle, and the stroke of the beam delimiting the total working width of the bodies. A rudder 21 situated behind the last share is fixed to the bottom portion of a post 22 which pivots relative to the beam 8 and which is rigidly connected to a gear wheel 23 meshing with another gear wheel 24 fixed to the last pivot 9 or to any other link means between the post 22 and the pivot 9.

Figure 3:
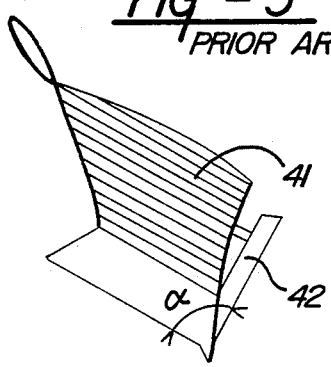
FIG. 3 shows the shape of a conventional body.

The assembly shown in FIG. 3 comprises a conventional plow body having a mold-board 41 with all of its horizontal generator lines being straight or convex going rearwards, thereby requiring a long mold-board in order to turn over the strip of earth properly since otherwise the earth falls down behind it without being turned over sufficiently. The leading attack angle α formed by a horizontal generator line and a line of advance parallel to the landside 42 is large enough to mean that the pressure on the mold-board requires a landside to extend over the entire length of the body in order to prevent the plow from skidding sideways. For a given angle α, the longer the mold-board, the greater adherence of the earth requires additional traction power over and above that required by the lateral pressure of the landside 42 against the wall of the furrow against which it is pressed.

Figure 4:
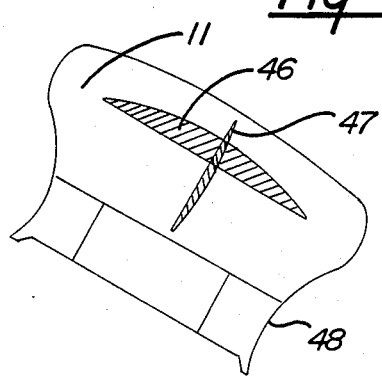
FIG. 4 shows the shape of a body, mold-boards, and share in accordance with the invention.

FIG. 4 shows an assembly constituting a body in accordance with the invention. In accordance with the invention, the working face of the mold-board 11 has a concave surface horizontally and vertically, the concavity extending over all or a portion of the surface of the mold-board, 11. The mold board 11 has a horizontal section 46, which is seen superimposed on FIG. 5, the section being concave to the degree as seen at the upper line of horizontal section 46 seen in FIG. 4. The vertical section 47 of the mold board is also superimposed on FIG. 4 and is also concave, with the degree of concavity seen at the righthand line of superimposed vertical section 47. The horizontal concavity seen at 46 is concave to an extent which can correspond to a given type of earth to be plowed, and with the degree of concavity varying from bottom to top. The concavity is generally more marked at the top in order to accentuate turning over, thereby reducing the effective working length of the mold-board over which earth passes. The mold-board angle of attack $\alpha$ is smaller, thereby avoiding the use of a landside on the body. Such a body which is concave in two directions, i.e. horizontally 46 and vertically 47, gives rise to a mold-board which is shorter at the top and gives rise to reduced lateral force, thereby requiring less tractive power.

In addition, in order to avoid a sharp angle that would slow down the flow over the share/mold-board junction of debris such as roots or plants, said junction has a curved portion 48 in accordance with the invention.

Figure 5A:
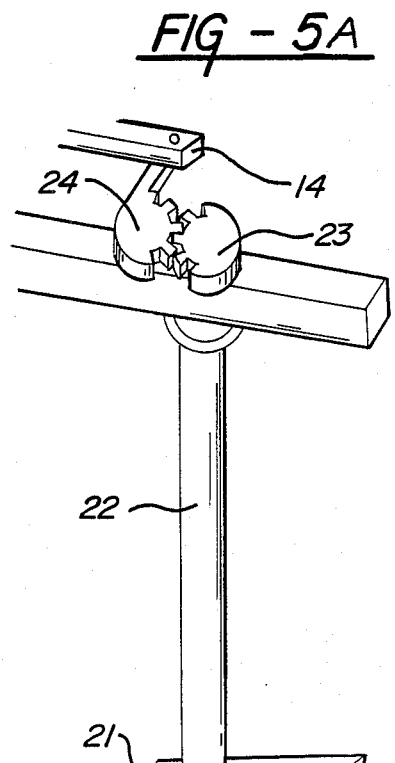

The assembly shown in FIG. 5 comprises a vertically directed shaft 51 having a guide plate 21 at its bottom end with the bottom edge of the guide plate being situated substantially at the same level as the bottom of the share 12, said shaft pivoting in a sleeve 52 which is fixed to the strut 10 with the top end of the shaft being fitted with a stay 53 which comes into contact with one or other of two abutments 54, depending on the working direction, said abutments being adjustable depending on the angle of attack adopted for the body. Instead of being fixed to the strut 10, the sleeve 52 could be received in the beam 8, in which case the shaft 22 (see FIG. 5a) would be connected to the control 14 for pivoting the bodies via a connection 55 for pivoting the rudders at the same time as the bodies are pivoted.

Figure 6:
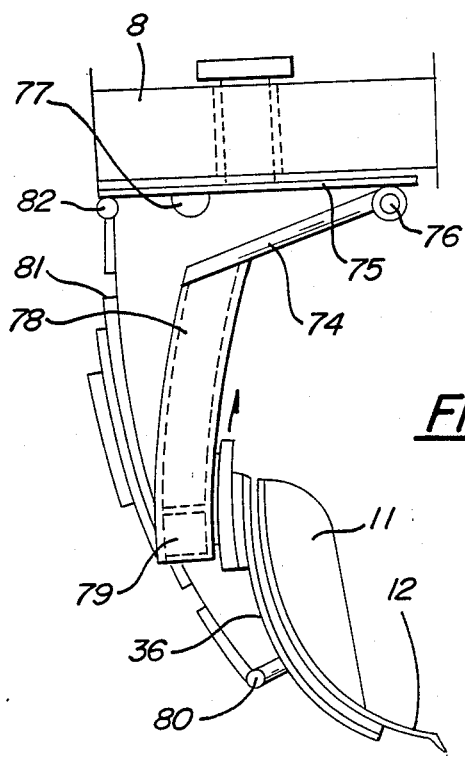
FIG. 6 is a profile view of a multi-direction safety system.
Figure 7:
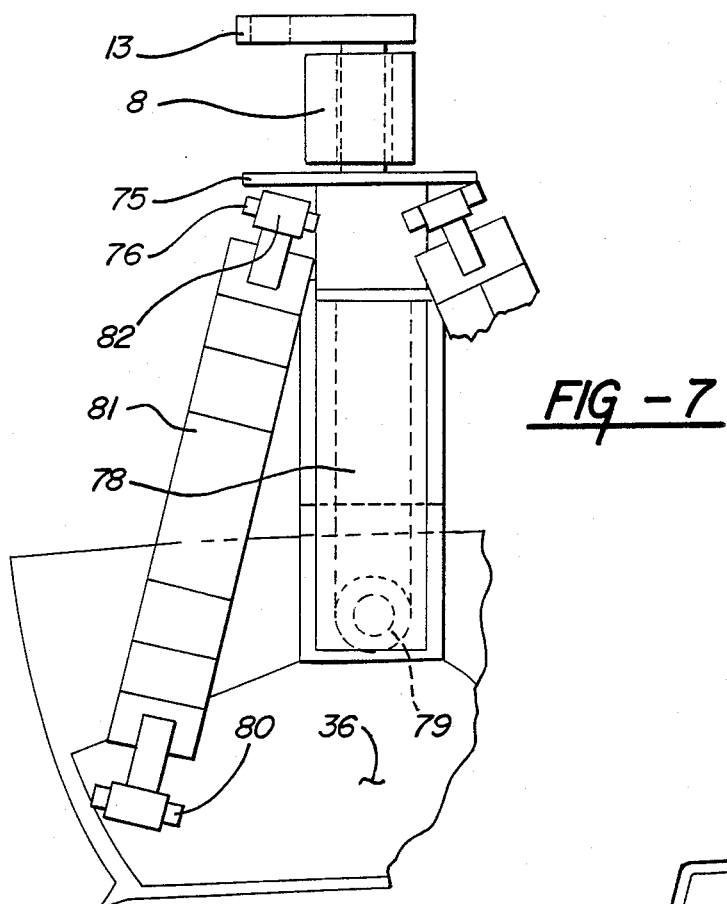
FIG. 7 is a rear half view of the same assembly.
Figure 8:
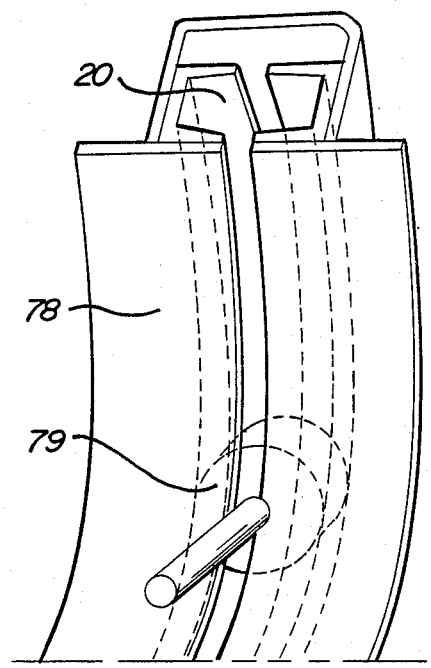
FIG. 8 is a detailed perspective view of the running path of the safety system.

The assembly constituted by FIGS. 6, 7, and 8 comprises: the top portion 74 of the strut connected to the pivot 9 by a plate 75 and a hinge 76 whose oscillation is limited by a flexible abutment 77; and a rigid rail portion 78 on the top portion 74 in which at least one wheel 79 runs, said wheel being supported by a shaft fixed on the sole 36 which receives the mold-board 11 and the share 12 and also the ends 80 of a pair of flexible links 81, each of whose top ends oscillate about a respective pin 82 fixed to the plate 75.

Operation is as follows:

When the tractor arrives at the end of the field in order to return along the line left by the last body, e.g. by righthand plowing, the plow is lifted off the ground, the hydraulic actuator 18 is actuated, the beam 3 leaves its right abutment 20, and continues its stroke until its encounters the left abutment 20. If the crank 15 pulled by the hydraulic actuator rod does not move during pivoting, then after the beam 18 makes contact with the abutment 20, the actuator thrusts the crank 15 until contact is made with the left abutment 19 at the leading angle of attack selected for the bodies.

In its displacement, the control 14 linking the cranks 13 and the pivots 9 also causes the rear rudder 21 to pivot from right to left.

When the bodies are protected by a safety system, with the skimmers being controlled hydraulically and independently for each body in order to avoid untimely displacements thereof during movements of the safety system, and when the portion in the ground (the share or the mold-board) encounters an obstacle, then various different movements are possible: if the obstacle, e.g. a stone, is situated at the front, the body tilts about the wheel support axis 79 while the wheel runs along the rail 78, thereby compressing resilient systems which reposition the body after the obstacle has been passed; if the obstacle is situated towards the back or in the middle, the body rises as guided by the wheel in the rail 78 and may also cause the top portion 74 and the rail to pivot about the top axis 76. Finally, the three motions: tilting, running of the wheel, and pivoting about the top axis, may be provoked simultaneously under pressure from the resilient systems 81. In most cases, the body moves close to and parallel with the ground, thereby ensuring better protection of the plow overall from the point of view of mechanical strength and also providing greater continuity in the turning over of the earth.

I claim:

1. A plow system adapted to be pulled by a pulling means and further adapted for two-way plowing whereby the plow will throw plowed earth in a first geographic direction to a first side of the pulling means when the pulling means advances in a first geographic sense, and, when the pulling means returns in a second geographic sense, 180° from the said first geographic sense, will throw plowed earth in the same said first geographic direction but to the opposite side of the returning pulling means, the plow system including:

at least one moldboard (11);

a first support means (10) for supporting said moldboard (11), said first support means (10) being operatively connected to said moldboard (11);

a second support means for supporting said first support means, said second support means including a main beam (8), the first support means being pivotably connected to the second support means;

means for connecting (1, 4) said second support means to the said pulling means so that the second support means is positioned at an acute angle to the direction of travel of said pulling means with the forward portion of the second support means directed to one side of the pulling means when the pulling means advances in a first geographical sense so as to throw plowed earth in said first geographical direction;

means for altering (17, 18) the relation of the second support means to the pulling means so that the forward portion of the second support means is directed to the opposite side of the pulling means when the pulling means returns in a second geographical sense, 180° from the said first geographical sense so as to throw plowed earth in the same said first geographical direction;

said moldboard (11) having a surface which contacts and throws the earth being plowed which is at least partially concave, this concave surface being concave in its horizontal section (46) as well as being concave in its vertical section (47), wherein the said surface of the moldboard has a concavity in its horizontal section which has a substantially shorter radius of curvature at the upper portion of the moldboard than at the lower portion of the moldboard.

2. A plowing system according to claim 1 including a share, the share being connected to the moldboard (48), and wherein the leading edge of the share-moldboard, when the share-moldboard is viewed from the side, is concave.

* * * * *